Jan. 23, 1934.  B. F. GRAVELY  1,944,789
GEARING
Filed Jan. 13, 1932  3 Sheets-Sheet 1
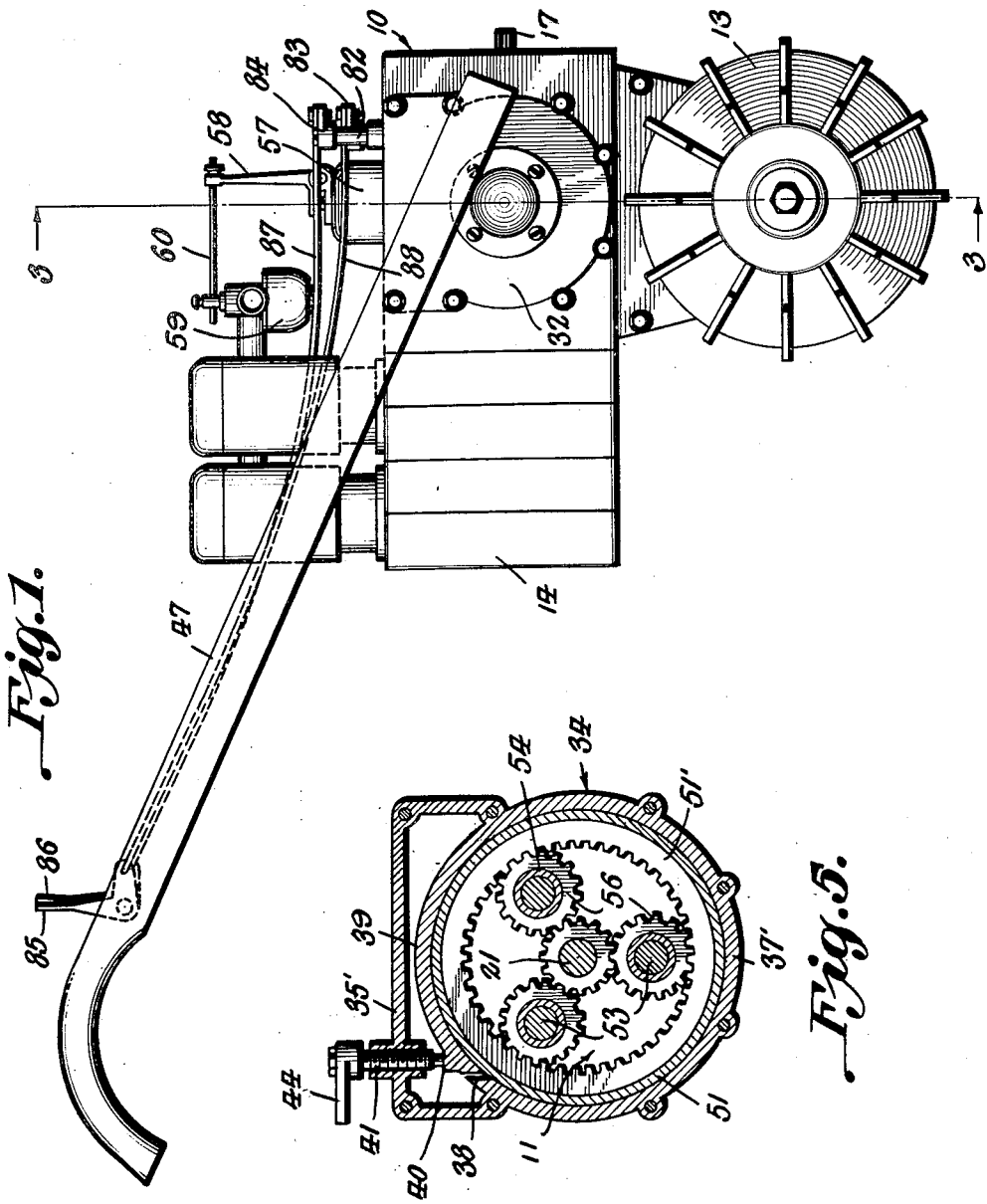
B. F. Gravely, Inventor
By
Attorney Jan. 23, 1934. B. F. GRAVELY 1,944,789
GEARING
Filed Jan. 13, 1932 3 Sheets-Sheet 2
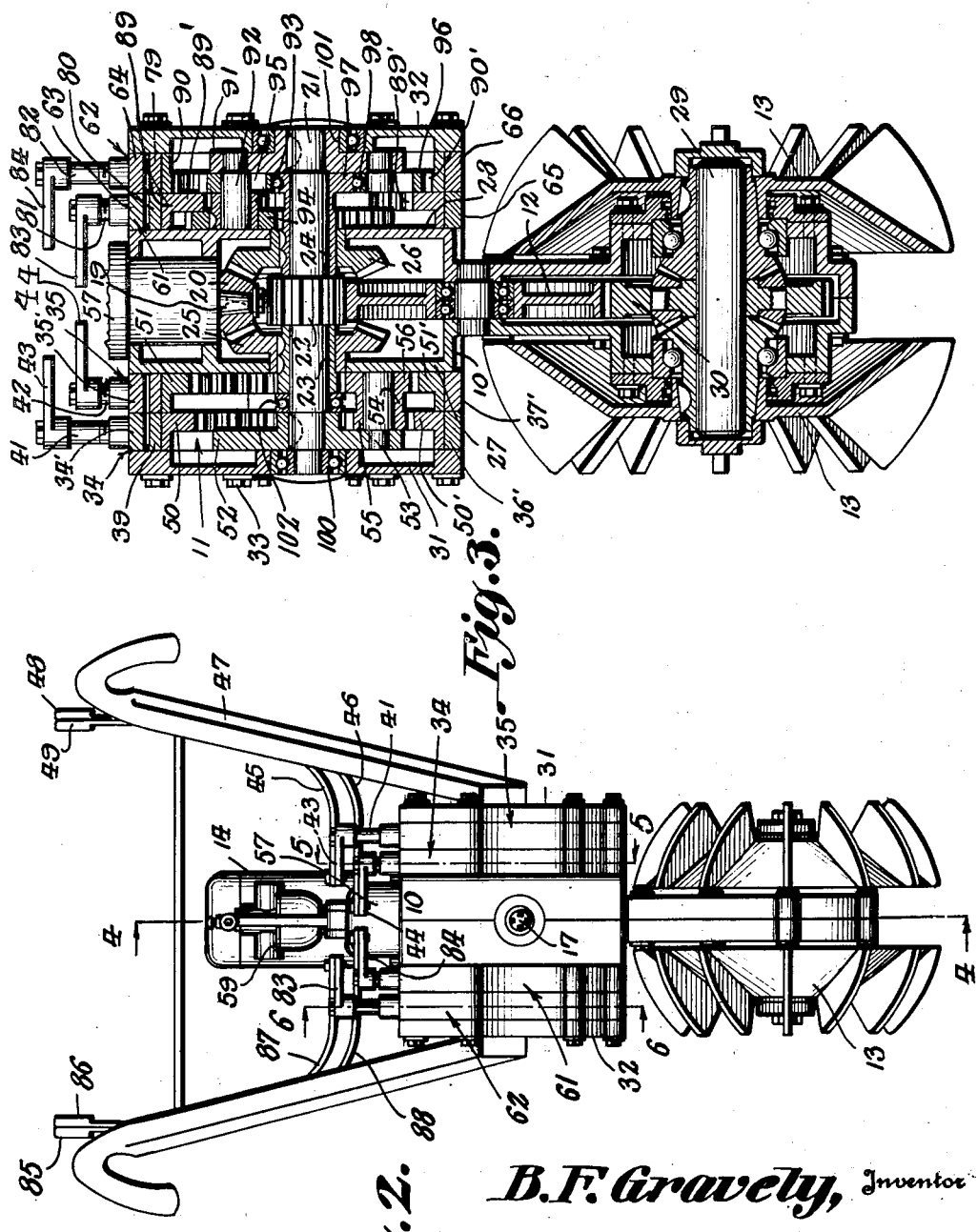
B. F. Gravely, Inventor Jan. 23, 1934. B. F. GRAVELY 1,944,789
GEARING
Filed Jan. 13, 1932 3 Sheets-Sheet 3
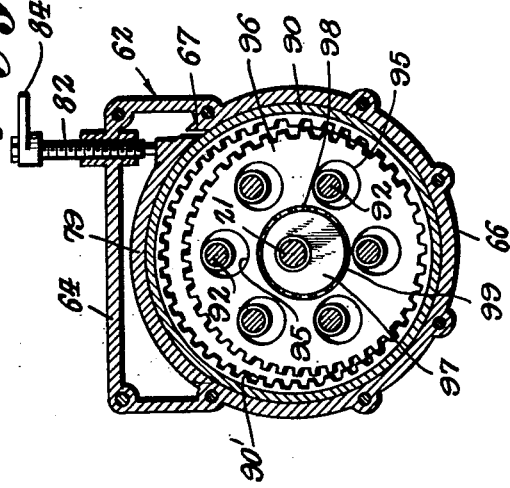
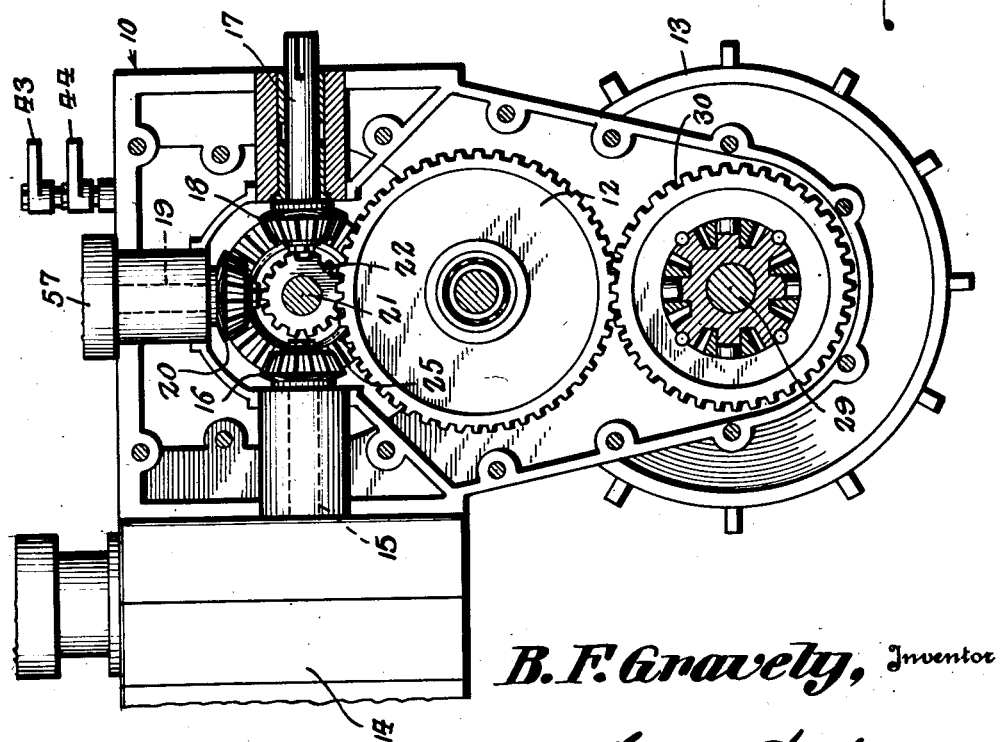
B. F. Gravely, Inventor Patented Jan. 23, 1934

1,944,789

UNITED STATES PATENT OFFICE 1,944,789

GEARING

Benjamin F. Gravely, Dunbar, W. Va.

Application January 13, 1932. Serial No. 586,392

4 Claims. (Cl. 74—34)

This invention relates to new and useful improvements in tractors, and particularly to tractors which are especially adapted for agricultural work, but which may be readily used for other work.

One object of the present invention is to provide a novel and improved form of multi-speed driving mechanism which is adapted to be easily and quickly taken apart, for the purpose of increasing or decreasing the number of gear speeds.

Another object is to provide a device of this character wherein the driving wheel, or ground wheel, may be easily removed and replaced by any one of a number of wheels for performing some special work.

Other objects and advantages will be apparent from the following description, when taken in connection with the accompanying drawings.

In the drawings:

Figure 1 is a side elevation of a tractor made in accordance with the present invention.

Figure 2 is a front elevation of the same.

Figure 3 is an enlarged vertical sectional view on the line 3—3 of Figure 1.

Figure 4 is an enlarged vertical sectional view on the line 4—4 of Figure 2.

Figure 5 is an enlarged vertical sectional view on the line 5—5 of Figure 2.

Figure 6 is a vertical sectional view on the line 6—6 of Figure 2.

Referring particularly to the accompanying drawings, 10 represents a suitable frame, elongated vertically, and containing, in its upper portion, a change speed gear device, represented, as a whole by the numeral 11, a transmitting gear 12, in its intermediate portion, and the ground engaging, and propelling wheel 13, in the lower portion, as clearly seen in the sectional views. Supported on the rear of the upper portion of said frame 10, is a motor 14, preferably of the internal combustion type, whose shaft 15 projects into the upper portion of said casing or frame, where it is provided with a driving bevel gear 16. Mounted in the forward portion of the frame 10, in direct alinement with the shaft 15, is a power take-off shaft 17, the inner end of which has a bevel gear 18, operated, as will be explained later herein, the outer end of said shaft being adapted for attachment of various devices to be driven. Extending downwardly through the upper wall of the frame 10 is a shaft 19, the lower end of which is provided with a bevel gear 20. Extending transversely through the center of the upper part of the frame 10 is a shaft 21, the intermediate portion of which is provided with a gear 22, and mounted on said shaft, at opposite sides of this central gear, are the sleeves 23 and 24, respectively, said sleeves being loose on said shaft, and keyed on these sleeves, respectively, are the bevel gears 25 and 26, which mesh with opposite sides of the bevel gear 20. Within the center of the frame 10, in spaced parallel relation to each other, and outwardly of the bevel gears 25 and 26, are the walls 27 and 28, through the centers of which the shaft 21 extends. It will be noted that the bevel gears 16, 18, and 20 mesh with the bevel gears 25 and 26. The wheel 13, in the lower portion of the frame 10, is provided with a supporting shaft 29, on the center of which is mounted a gear 30, said gear meshing with the before-mentioned gear 12, said gear 12 also meshing with the before-mentioned gear 22 of the shaft 21, as clearly seen in the sectional views of the drawings.

Spaced outwardly of the walls 27 and 28, respectively, are the walls 31 and 32, the same being held in proper relation by the bolts 33, passing therethrough. Disposed between the members or walls 27 and 31, are the frame members 34 and 35, respectively, upper skeleton portions 34' and 35', respectively, approximately rectangular in outline, and lower circular ring portions 36' and 37', respectively. It will be noted by reference to Figure 5, that a part of the ring portion 36' extends upwardly within the rectangular portion 34', and is disconnected or split at the point 38, so as to provide the flexible portion 39, the upper face of the free end of which is formed with a small platform 40, on which bears the end of the screw shaft 41, which is threaded through the upper wall of the portion 34'. It is to be understood that the upper part of the ring portion 37' is partly separated from the rest of the ring, similarly to the ring part 39, and is operable by the threaded shaft 42, engaged in the top of said frame portion. Fixed on the upper ends of the threaded shafts 41 and 42, respectively, are the laterally extending arms 43 and 44, to which are pivotally connected the operating rods 45 and 46, respectively, which rods extend rearwardly, along the handle bars 47, which are properly secured to the operating levers 48 and 49, pivotally mounted on said handle bars.

Loosely fitted within the ring portions 36' and 37' are the internal ring gears 50 and 51, respectively, the inwardly projecting toothed portions 50' and 51', of which being of different diameters, the former being slightly smaller than the latter. Keyed on the end portion of the shaft 21, within the ring gear 50, is a carrier disk 52, which supports the three stub shafts 53, said stub shafts extending inwardly through the openings of these ring gears, and each rotatably supporting a spool or planet gear 54. The peripheries of the ends of these planet gears are toothed, as shown at 55 and 56, respectively, the former being of slightly smaller diameter, and meshing with the teeth of the ring gear 50, while the latter meshes with the teeth of the ring gear 51. It will be noted that the inner end of the beforementioned sleeve 23 is externally toothed, and meshes with the larger ends of the planet gears 54.

The upper end of the shaft 19 is connected with a suitable governor 57, which governor includes a pivoted lever 58, connected with the carburetor 59, of the engine, by means of the operating rod 60.

Disposed between the walls 28 and 32 are the skeleton frame members 61 and 62, similar to the members 34 and 35, having the upper rectangular portions 63 and 64 and lower ring portions 65 and 66, the latter of which are separated at 67 and 68, to provide the flexible portions 79 and 80, adapted to be flexed by the threaded shafts 81 and 82, through the medium of the arms 83 and 84, carried thereby, and operated by the levers 85 and 86, on the handle bars, through the medium of the rods 87 and 88, connected thereto. Disposed within the ring portions 65 and 66, respectively, are the internal ring gears 89 and 90.

It will be noted that the shaft 21 also extends through the centers of the ring gears 89 and 90, and on this end of the shaft is keyed a carrier disk 91, of the same diameter and construction as the carrier 52. The carrier disk 91 carries the inwardly extending stub shafts 92, on which are rotatably supported the spool or planet gears 93, said gears having their larger toothed ends 94 meshing with the toothed portion 89', of the ring gear 89, and their other ends disposed through the circular openings 95, in the wobble gear 96, whose peripheral toothed portion is thereby held in mesh with the internal toothed portion 90', of the gear 90. On the outer end of the sleeve 24 is a cam 97, which rotates within the series of bearings 98, within the correspondingly formed opening 99, in the center of the wobble gear 96. As clearly shown, this wobble gear 96 is smaller in diameter than the ring gear 90, and the stub shafts, by their engagement through the openings 95, so support the wobble gear as to maintain a portion of its teeth in mesh with the teeth of the ring gear 90.

From the foregoing it will be understood that the engine 14 transmits its power through the shaft 15, and such shaft having the bevel gear 16, meshing with the bevel gears 25 and 26, power may be transmitted to the shaft 21, at different speeds forwardly, and at a speed rearwardly, in a reverse direction, whereby the tractor may be used to draw devices backwardly.

The gear 16 turns toward the right, so as to turn the gear 25 toward the observer and the gear 26 away from the observer. The gear teeth of the sleeve 23, meshing with the teeth of the larger ends of the planet gears 56, rotate said gears away from the observer, whereby to cause the ring gear 51 to rotate therewith, in the same direction. If, however, the ring portion 35' is drawn into frictional engagement with the ring gear 51, so as to hold said gear against rotation, the planet gears will travel around within said gear, whereby to cause the rotation of the gear carrier disk 52, and the consequent rotation of the shaft 21, due to the fact that said carrier disk is keyed to said shaft.

If, through the movement of the arm or lever 43, the gear ring 50 is held against rotation, the toothed portions 55, of the planet gears 54 travel on the toothed portion 50', of said ring gear, whereby to cause the carrier disk 52 to be rotated, and the shaft 21 to be driven thereby. Due to the fact that the toothed portion of the planet gears are of different diameters, and the toothed portions of the ring gears 50 and 51 are also of different diameters, and of different ratios, the shaft 21 will be driven at different speeds, in accordance with which of the ring gears is held against rotation.

It will be noted that the bevel gear 26 rotates from the observer, whereupon its toothed portion which is keyed to the sleeve 24 rotates the planet gears 94, whereupon the ring gear 89 will be rotated loosely, but, when the ring gear 89 is held against rotation, by the flexible ring 63, the planet gear 94 will travel around within the ring gear, and through the medium of the stub shafts 92, cause the carrier disk 91 to be rotated, and the shaft 21 to be thereby rotated, in a direction opposite to that in which the said shaft was rotated through the medium of the bevel gear 25, thereby producing a reverse movement.

When, however, the operator holds the gear ring 90 against rotation, the rotation of the cam 97 will cause the eccentric rotation of the wobble gear 96, so that it will roll around within said gear ring, with the result that the carrier disk 91 will be rotated, and due to the latter being keyed to the end of the shaft 21, said disk will cause the rotation of said shaft in the same direction as when rotated through the medium of the bevel gear 25, but at a much lower speed. Thus the driving gear of the tractor is capable of three speeds ahead, and one speed, in reverse. The operator can easily and quickly control the change of the gear speeds, by simply operating the hand grips mounted on the handle bars of the tractor. Motion is transmitted from the shaft 21, to the ground wheel 13, through the medium of the gear 12, whereby the tractor is propelled along the ground.

The ends of the shaft 21 are properly supported by ball bearings 100 and 101, the former being arranged between the shaft and the wall of an opening in the wall 31, while the latter are arranged between the hub of the disk 91 and the wall of an opening in the wall 32. Thrust bearings 102 are disposed between the inner ends of the sleeve and of the hub of the disk 52, as is clearly illustrated.

What is claimed is:

1. A change speed gearing including a plurality of frame members secured together in alinement and each comprising a skeleton having an open upper portion and an open ring portion, differently sized gear elements loosely supported in said ring portions, a driven shaft extending through said gear elements, a drive shaft in driving relation to the driven shaft, driving gears between the said driven shaft and said drive shaft, and means for selectively coupling said driving gears with said gear elements and said driven shaft whereby to produce different gear speeds.

2. A change speed gear comprising supporting means, open skeleton frame members held within said supporting means, each of said frame members including an upper portion and a lower circular portion, said lower portion being partially separated to form a flexible gripping means, an internal ring gear loosely supported within each circular portion, a carrier adjacent each ring gear, planet gears on one of said carriers engaging with said ring gear, a drive shaft, a driven shaft, gears engaged with the drive shaft and said planet gears, said planet gears having stub shafts carried by said other carrier, a gear of smaller diameter than the other internal ring gear and operable therewith and having openings receiving said stub shafts therethrough, and means for selectively holding said ring gears whereby to produce different gear driving speeds.

3. Gearing including a driven shaft, sleeve rotatable on said shaft, a driving shaft geared to said sleeves to rotate the sleeves on the driven shaft, a series of ring gears surrounding the driven shaft, idlers carried by said driven shaft and geared to said sleeves and ring gears, and means to secure the ring gears selectively against rotation.

4. Gearing including a driven shaft, sleeves rotatable on said shaft, a driving shaft geared to said sleeves to rotate the sleeves on the driven shaft, a series of ring gears surrounding the driven shaft, idlers carried by said driven shaft and geared to said sleeves and ring gears, ring frames surrounding said ring gears, and means to effect braking engagement selectively between said frames and ring gears.

BENJAMIN F. GRAVELY.